(12) United States Patent
Porte et al.

(10) Patent No.: US 11,325,717 B2
(45) Date of Patent: May 10, 2022

(54) AIRCRAFT NACELLE INCLUDING A LINK BETWEEN A CONDUIT OF AN AIR INLET AND A CONDUIT OF AN ENGINE

(71) Applicant: Airbus Operations SAS, Toulouse (FR)

(72) Inventors: Alain Porte, Colomiers (FR); Frédéric Vinches, Larra (FR)

(73) Assignee: AIRBUS OPERATIONS SAS, Toulouse (FR)

( * ) Notice: Subject to any disclaimer, the term of this patent is extended or adjusted under 35 U.S.C. 154(b) by 1059 days.

(21) Appl. No.: 15/730,954

(22) Filed: Oct. 12, 2017

(65) Prior Publication Data
US 2018/0105281 A1    Apr. 19, 2018

(30) Foreign Application Priority Data

Oct. 13, 2016 (FR) ..................................... 1659895
Oct. 13, 2016 (FR) ..................................... 1659899

(51) Int. Cl.
*B64D 33/02* (2006.01)
*B64C 7/02* (2006.01)
(Continued)

(52) U.S. Cl.
CPC ................ *B64D 33/02* (2013.01); *B64C 7/02* (2013.01); *B64D 29/00* (2013.01); *F02C 7/045* (2013.01);
(Continued)

(58) Field of Classification Search
CPC .... B64D 33/02; B64D 33/0206; B64D 29/00; B64D 2033/0286; B64D 2033/0273;
(Continued)

(56) References Cited

U.S. PATENT DOCUMENTS 4,449,607 A * 5/1984 Forestier ................. F02K 1/827
    181/213
5,603,471 A   2/1997 Armstrong
    (Continued)

FOREIGN PATENT DOCUMENTS

EP    0057621    8/1982
EP    1013910    6/2000
    (Continued)

OTHER PUBLICATIONS

French Search Report, dated Jun. 14, 2017 priority document FR1659895.
(Continued)

*Primary Examiner* — Medhat Badawi
*Assistant Examiner* — Vicente Rodriguez
(74) *Attorney, Agent, or Firm* — Greer, Burns & Crain, Ltd.

(57) ABSTRACT

An aircraft nacelle including a conduit rigidly connected to an air inlet and a conduit rigidly connected to an engine, a link between the conduit rigidly connected to the air inlet and the conduit rigidly connected to the engine. The link includes a sleeve that receives one end of a first conduit and is rigidly connected to a second conduit, and linking elements that link the sleeve and the first conduit and that are distributed about the entire circumference of the nacelle, each linking element having a threaded stem oriented in a radial direction and being configured to enable tightening from inside the first conduit.

8 Claims, 6 Drawing Sheets

(51) Int. Cl.
 *F02C 7/045* (2006.01)
 *B64D 29/00* (2006.01)
(52) U.S. Cl.
 CPC ........... *B64D 2033/0206* (2013.01); *B64D 2033/0273* (2013.01); *B64D 2033/0286* (2013.01); *F05D 2220/323* (2013.01); *F05D 2230/60* (2013.01); *F05D 2230/70* (2013.01); *F05D 2260/30* (2013.01); *F05D 2260/31* (2013.01); *F05D 2260/963* (2013.01); *Y02T 50/60* (2013.01)
(58) Field of Classification Search
 CPC . B64C 7/02; F02C 7/045; Y02T 50/60; Y02T 50/672; F05D 2230/70; F05D 2230/60; F05D 2260/31; F05D 2260/963; F05D 2260/30; F05D 2220/323
 See application file for complete search history.

(56) References Cited

U.S. PATENT DOCUMENTS

| | | | |
|---|---|---|---|
| 5,706,648 | A | 1/1998 | Porte et al. |
| 6,123,170 | A * | 9/2000 | Porte ............... F01D 25/243 |
| | | | 181/214 |
| 6,328,258 | B1 * | 12/2001 | Porte ............... B64D 33/02 |
| | | | 244/53 B |
| 8,985,506 | B2 * | 3/2015 | Vauchel ............ B64D 33/02 |
| | | | 244/53 B |
| 2005/0252195 | A1 * | 11/2005 | Porte ............... F02C 7/045 |
| | | | 60/226.1 |
| 2010/0320316 | A1 * | 12/2010 | Vauchel ............ F02C 7/045 |
| | | | 244/1 N |
| 2011/0033286 | A1 * | 2/2011 | Vauchel ............ F02C 7/045 |
| | | | 415/182.1 |
| 2011/0119797 | P1 | 5/2011 | Slaughter et al. |
| 2012/0261521 | A1 | 10/2012 | Porte et al. |
| 2013/0098471 | A1 | 4/2013 | Porte et al. |
| 2013/0121814 | A1 | 5/2013 | Hurlin et al. |
| 2013/0212862 | A1 * | 8/2013 | Sleath ............... F01D 25/285 |
| | | | 29/525.01 |
| 2013/0266448 | A1 | 10/2013 | Blin et al. |
| 2015/0007896 | A1 | 1/2015 | Joret et al. |
| 2016/0251085 | A1 | 9/2016 | Stark |

FOREIGN PATENT DOCUMENTS

| | | |
|---|---|---|
| EP | 2241504 | 10/2010 |
| EP | 2998226 | 3/2016 |
| FR | 2926789 | 7/2009 |
| FR | 2954282 | 6/2011 |
| FR | 2960216 | 11/2011 |
| GB | 2259954 | 3/1993 |
| WO | 2011086281 | 7/2011 |

OTHER PUBLICATIONS

French Search Report, dated May 31, 2017 priority document FR1659899.

* cited by examiner

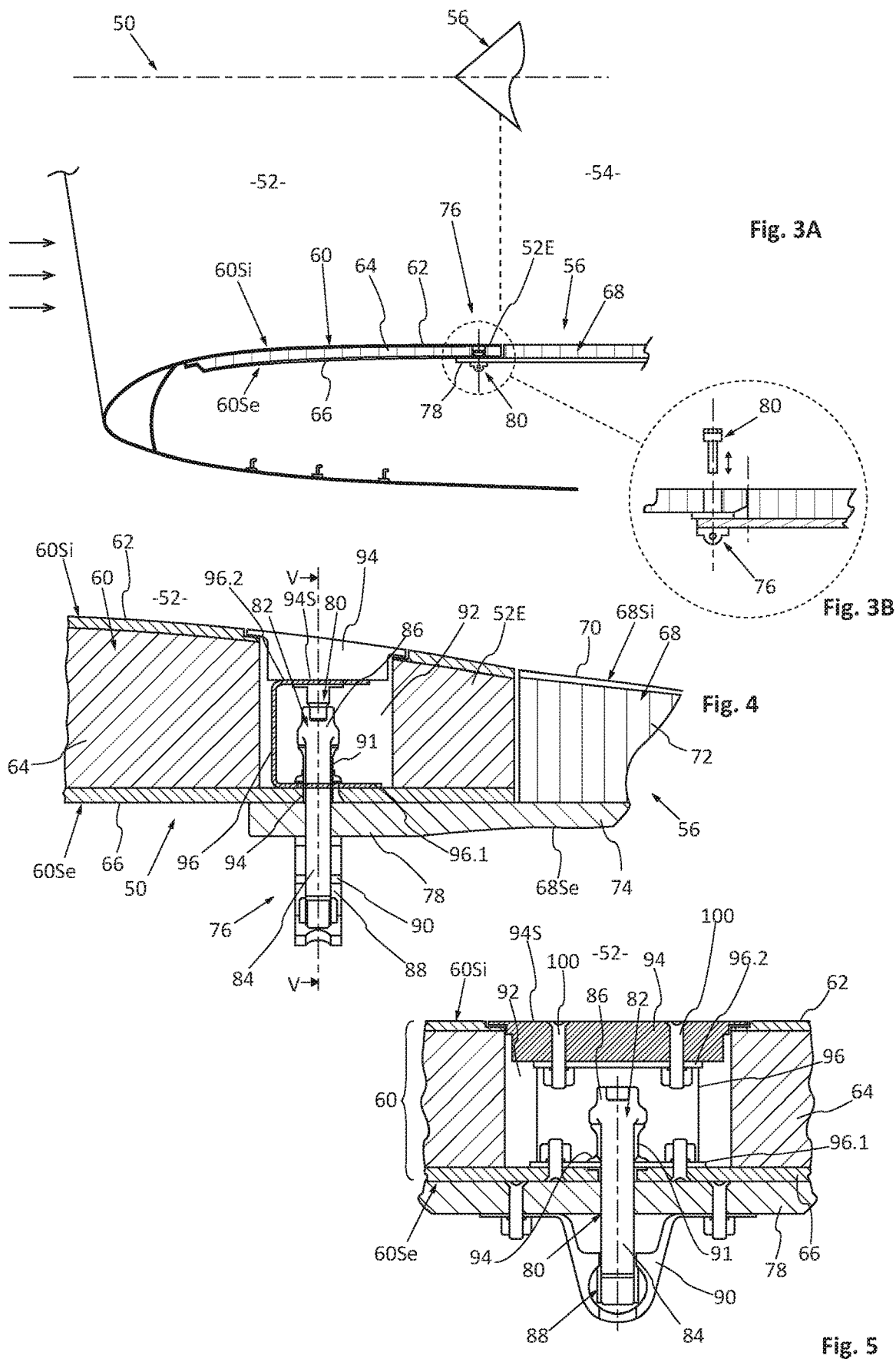

AIRCRAFT NACELLE INCLUDING A LINK BETWEEN A CONDUIT OF AN AIR INLET AND A CONDUIT OF AN ENGINE

CROSS-REFERENCES TO RELATED APPLICATIONS

This application claims the benefit of the French patent application No. 1659899 filed on Oct. 13, 2016 and of the French patent application No. 1659895 filed on Oct. 13, 2016 the entire disclosures of which are incorporated herein by way of reference.

BACKGROUND OF THE INVENTION

The present invention relates to an aircraft nacelle including a link between a conduit of an air inlet and a conduit of an engine.

As shown in FIG. 1, an aircraft nacelle has an air inlet 10 at the front designed to channel an air flow towards an engine 12.

In the remainder of the description, the longitudinal direction corresponds to the direction of the axis of the engine. A longitudinal plane is a plane that contains the axis of the engine. A transverse plane is a plane perpendicular to the axis of the engine. A radial direction is a direction perpendicular to the axis of the engine. The terms front and rear refer to the direction of flow of the air flow in the nacelle. The front corresponds to a zone in which the air flow enters the nacelle and the rear corresponds to a zone in which the air flow leaves the nacelle.

The air inlet 10 has a lip 14 that is extended inside the nacelle by a first conduit 16 having substantially circular sections, and outside the nacelle by an outer wall 18 having substantially circular sections. The engine has a second conduit 20 that can be arranged to extend the inner conduit 16.

According to one embodiment, the first conduit 16 is delimited by juxtaposed acoustic panels 22 arranged around the entire circumference of the first conduit 16, each having an acoustically resistive layer 24, at least one honeycomb layer 26 and one reflective layer 28 arranged in the radial direction moving away from the axis of the engine.

In the present application, layer shall also be understood to mean a plurality of superposed layers.

The second conduit 20 is also delimited by juxtaposed panels 30 arranged around the entire circumference of the second conduit 20.

As shown in FIG. 2, the air inlet 10 is linked to the engine 12 by a link that includes a first annular flange 32 linked to the first conduit 16 and a second annular flange 34 that is rigidly connected to the second conduit 20. The two annular flanges 32 and 34 are pressed against one another at a joining plane 36 that is substantially perpendicular to the longitudinal direction and are held there by linking elements 38, for example bolts or rivets, that pass through the annular flanges 32, 34, their axis being parallel to the longitudinal direction.

The first flange 32 is a first leg of a first L-shaped connector 40, the second leg of which is linked to the reflective layer 28. Only the first L-shaped connector 40 is metal. The acoustic panel, and notably the reflective layer 28, is made of composite material, which helps to reduce the on-board mass. The link between the air inlet and the engine includes a first series of linking elements 38 linking the first and second annular flanges 32 and 34 and a second series of linking elements 42 linking the first L-shaped connector 40 and the acoustic panels 22 of the first conduit 16.

The panels 30 of the second conduit 20 may also be made of composite material. In this case, as for the first annular flange 32, the second annular flange 34 is built into a second metal L-shaped connector. In this case, the link between the air inlet and the engine includes a first series of linking elements linking the first and second L-shaped connectors, a second series of linking elements linking the first L-shaped connector and the acoustic panels of the first conduit 16 and a third series of linking elements linking the second L-shaped connector and the panels 30 of the second conduit 20. In this case, the mass gain resulting from use of composite materials for the panels 30 of the second conduit 20 is reduced on account of the presence of three series of linking elements.

According to another drawback, regardless of embodiment, the linking elements 38, 42 are only accessible from outside the nacelle, which requires the provision of removable covers in the outer wall 38 to provide access to the linking elements 38, 42.

Document EP0057621 describes a sound-damping lining for a conduit of a turbo jet engine fan. According to this document, a conduit is fitted with a lining comprising a plurality of panels that are juxtaposed about the circumference of the conduit and that are linked to the conduit by bolts, each of which passes through a cross member and a washer. Each bolt has a head that is accessible from inside the conduit, a nut and a locking washer. This locking washer prevents the bolt from working loose when in operation. To enable each bolt to be tightened, the head and the nut must be accessible, and therefore removable covers are required to access the nuts of the bolts.

The present invention is intended to address the drawbacks in the prior art.

SUMMARY OF THE INVENTION

For this purpose, the invention relates to an aircraft nacelle including a conduit rigidly connected to an air inlet and a conduit rigidly connected to an engine, a link between the conduit rigidly connected to the air inlet and the conduit rigidly connected to the engine, characterized in that the link includes a sleeve designed to receive one end of a first conduit that is either the conduit rigidly connected to the air inlet or the conduit rigidly connected to the engine, the sleeve being rigidly connected to a second conduit that is either the conduit rigidly connected to the air inlet or the conduit rigidly connected to the engine, as well as linking elements that link the sleeve and the first conduit and that are distributed about the entire circumference of the nacelle, each linking element having, firstly, a screw with a threaded stem that is oriented in a radial direction and a head that is accessible from the inside of the first conduit, and, secondly, a nut that is screwed onto the threaded stem and that is linked to the sleeve by a system for preventing the nut from rotating about a radial axis of rotation.

According to the invention, the air inlet and the engine are linked by a single series of linking elements and the conduit of the air inlet, the conduit of the engine and the sleeve are made of composite material. According to another aspect, the linking elements may be positioned and tightened exclusively from the inside of the conduits, thereby obviating the need for removable covers in the outer wall of the nacelle, thereby helping to reduce the on-board mass.

According to another characteristic, the first conduit has at least one acoustic panel comprising an acoustically resistive layer, at least one honeycomb layer and one reflective layer arranged in the radial direction moving away from the axis of the engine and, for each linking element, at least the acoustically resistive layer and the honeycomb layer have a recess designed to receive the head of the linking element.

According to a first variant, each acoustic panel has, for each recess, a stopper that is linked to the acoustic panel and that has a surface extending an inner surface of the acoustic panel.

According to a second variant, each recess has a peripheral rim having a section substantially identical to a section of the head of the linking element, the head of the linking element having a surface extending an inner surface of the acoustic panel, an O-ring being positioned between the linking element and the peripheral rim of the recess.

According to another characteristic, the link has at least one linking strip that is designed or configured to link the first conduit and the sleeve and that is arranged between the first conduit and the sleeve, each linking strip having at least one first joining zone that is designed to link the linking strip and the sleeve and that is offset from the first conduit in the radial direction and at least one second joining zone that is designed to link the linking strip and the first conduit and that is offset in the longitudinal direction in relation to the first joining zone.

According to another characteristic, each linking strip is designed to deform elastically in the radial direction when in operation.

According to another characteristic, each linking strip has a third joining zone that is designed to link the linking strip and the first conduit, the second and third joining zones being arranged on either side of the first joining zone.

According to another characteristic, the second joining zones are arranged at the front of the nacelle in relation to the first joining zones and each linking strip includes an edge oriented towards the rear of the nacelle that is free.

According to another characteristic, each linking strip has an edge oriented towards the second curved conduit.

The invention also relates to an aircraft including a nacelle according to the invention.

BRIEF DESCRIPTION OF THE DRAWINGS

Other features and advantages are set out in the description of the invention below, given purely by way of example and with reference to the attached drawings, in which:

FIG. 3A is a cross section of a front lower portion of a nacelle of an aircraft that shows a first variant of the invention, FIG. 3B is a detailed cross section showing the first variant shown in FIG. 3A during disassembly, FIG. 4 is a longitudinal cross section of a link between an air inlet and an engine that shows a variant of the invention in detail, FIG. 5 is a cross section taken along the line V-V in FIG. 4.

DETAILED DESCRIPTION OF THE PREFERRED EMBODIMENTS

Figure 1:
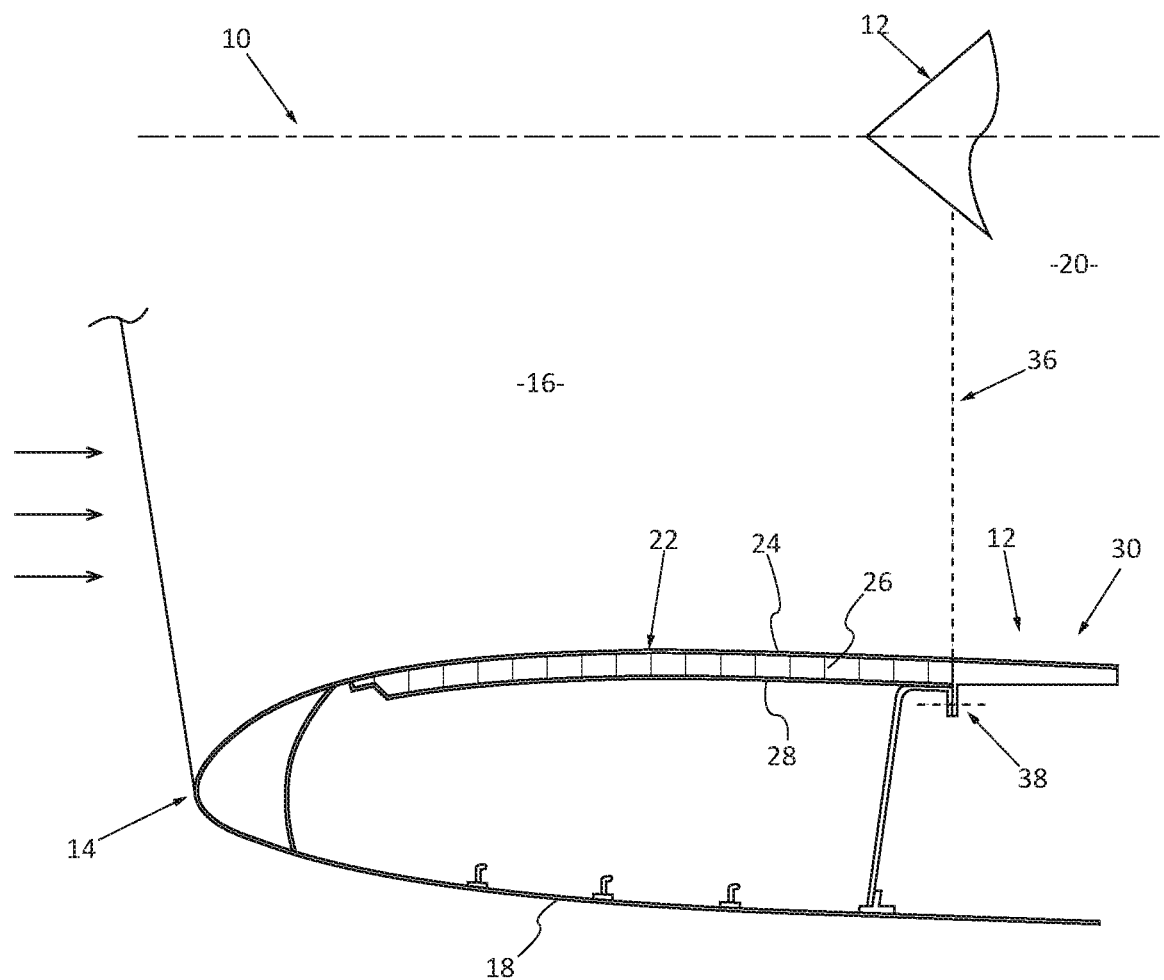
FIG. 1 is a cross section of a front lower portion of a nacelle of an aircraft that shows an embodiment of the prior art.
Figure 2:
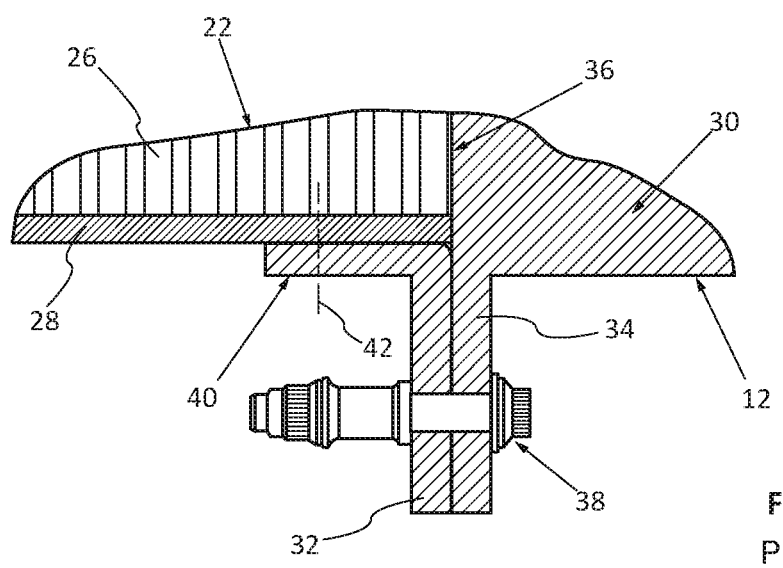
FIG. 2 is a cross section of a link between an air inlet and an engine that shows an embodiment of the prior art.

As in the prior art, an aircraft nacelle according to the invention has an air inlet 50 at the front with a first conduit 52 designed to channel an air flow towards a second conduit 54 of an engine 56 that extends the first conduit.

The first conduit 52 has at least one acoustic panel 60, and usually several acoustic panels 60 that are juxtaposed about the circumference of the first conduit 52. Each acoustic panel 60 comprises an acoustically resistive layer 62, at least one honeycomb layer 64 and one reflective layer 66 arranged in the radial direction moving away from the axis of the engine.

Each acoustic panel 60 has an inner surface 60Si that is in contact with the air flow in the first conduit 52 and an outer surface 60Se opposite the inner surface 60Si.

The second conduit 54 usually has at least one panel 68, and usually several panels 68 that are juxtaposed about the circumference of the second conduit 54. According to a layout shown in FIG. 4, the panels 68 are acoustic panels, each of which comprises an acoustically resistive layer 70, at least one honeycomb layer 72 and one reflective layer 74, hereinafter also referred to as the outer wall 74, arranged in the radial direction moving away from the axis of the engine.

Each panel 68 has an inner surface 68Si that is in contact with the air flow in the second conduit 54 and an outer surface 68Se opposite the inner surface 68Si.

The acoustic panels 62 are not described in greater detail since such panels are known to the person skilled in the art. The same is true for the panels 68 of the second conduit 54, which are known as "fan cases."

The air inlet 50 and the engine 56 are linked by a link 76 that includes a sleeve 78 that is rigidly connected to the second conduit 54, which is designed to receive one end of the first conduit 52 as well as linking elements 80 that link the sleeve 78 and the first conduit 52, and that are distributed about the entire circumference of the nacelle and that have stems that are oriented radially.

Figure 10:
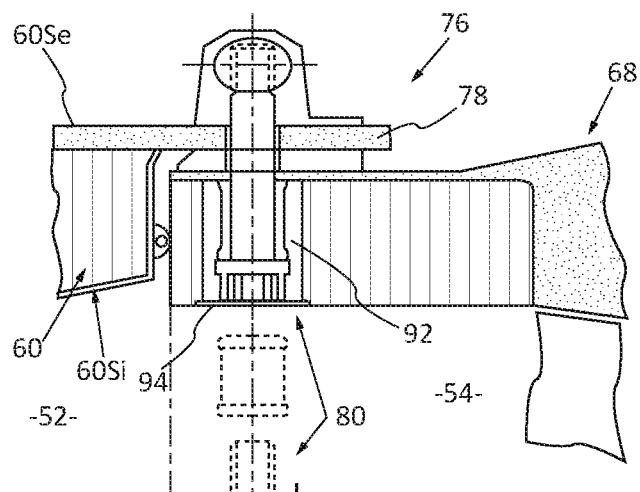
FIG. 10 is a cross section of a front upper portion of a nacelle of an aircraft that shows another variant of the invention.

According to another variant shown in FIG. 10, the sleeve 78 is rigidly connected to the first conduit 52, the second conduit 54 fits into the sleeve 78 and the linking elements 80 link the sleeve 78 and the second conduit 54.

Rigidly connected to the first conduit 52 or to the second conduit 54 means that the sleeve 78 is integral with the first or second conduit 52 or 54 or integral with at least one of the layers of the first or second conduit 52 or 54.

According to the invention, the first conduit 52 of the air inlet 50 and the second conduit 54 of the engine 56 are linked by a series of linking elements 80 only. Furthermore, the first conduit 52, the second conduit 54 and the sleeve 78 may be made of composite material where the sleeve 78 is oriented longitudinally and extends one of the two conduits 52, 54.

According to one embodiment, the outer wall 74 of each panel 68 extends towards the front of the nacelle in relation to the rest of the panel 68. Thus, the outer walls 74 of the panels 68 form a sleeve 78 that is designed to receive the end 52E of the acoustic panels 60 of the first conduit 52. The sleeve 78 is separated from the inner surface 68Si of each panel 68 by a distance equal to or greater than the height (distance measured along the radial direction) of the end 52E of the acoustic panels 60 of the first conduit 52 so that the inner surfaces 68Si of the panels 68 of the second conduit 54 extend the inner surfaces 60Se of the acoustic panels 60 of the first conduit 52.

Each linking element 80 is a bolt comprising firstly a screw 82 with a threaded stem 84 that is oriented in the radial direction and a head 86, and secondly a nut 88 designed to enable screwing of the threaded stem 84.

According to one characteristic of the invention, the nut 88 is linked to the sleeve 78 by a system designed to prevent the nut 88 from rotating about a radial axis of rotation, thereby enabling the screw 82 to be screwed and tightened without having to prevent the nut 88 from rotating using a tool.

According to one embodiment, the nut 88 is linked directly to the outer surface of the sleeve 78, for example by riveting, crimping or otherwise.

According to another embodiment shown, for example, in FIGS. 4 and 5, the nut 88 is a barrel nut and is prevented from rotating in a supporting element 90 that is in turn linked to the outer surface of the sleeve 78.

The linking elements 80 may each have a compressible sheath 91 that is positioned about the threaded stem 84.

The head 86 of each linking element 80 is sunk into the acoustically resistive layer 62 and/or the honeycomb layer 64 of the acoustic panels 60.

According to an embodiment shown in FIGS. 4 and 5, for each linking element 80, the acoustically resistive layer 62 and the honeycomb layer 64 have a recess 92 that is designed or configured to receive the head 86. The reflective layer 66 has a through hole 94 with a section smaller than the head 86 of the linking element 80.

Figure 6:
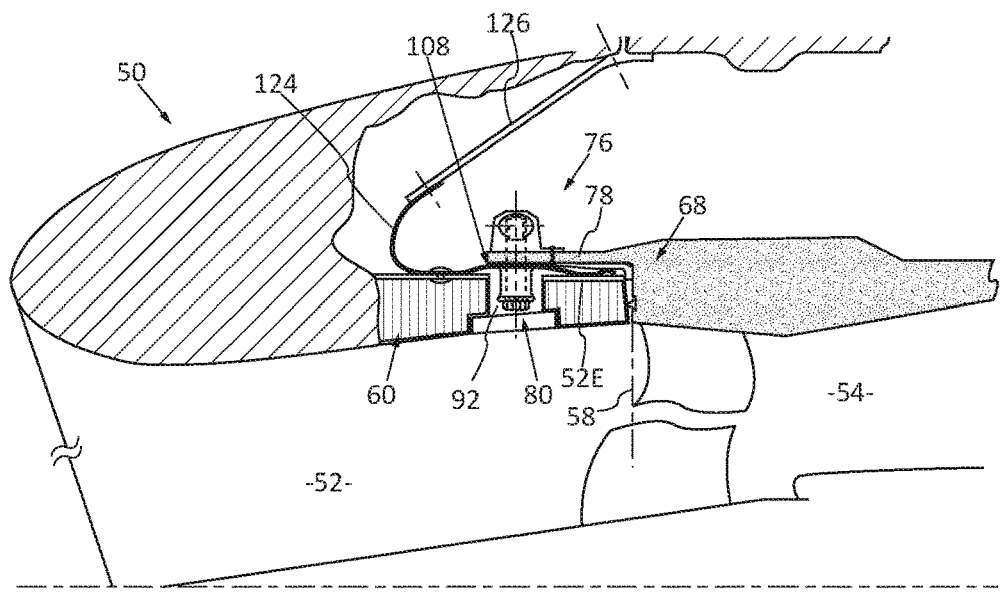
FIG. 6 is a cross section of a front upper portion of a nacelle of an aircraft that shows another variant of the invention.
Figure 7:
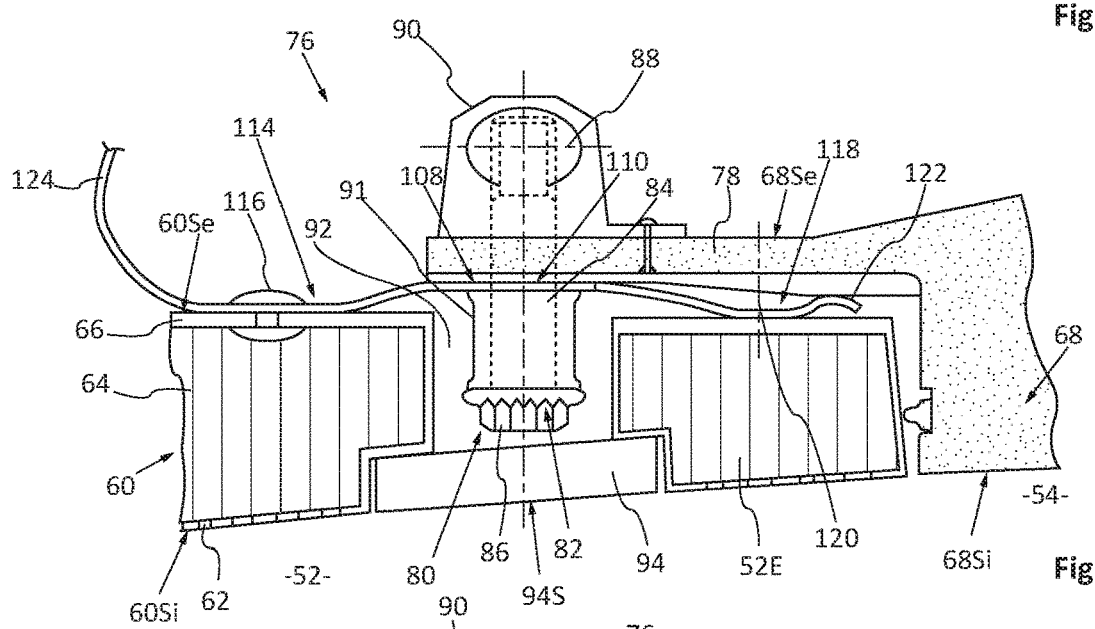
FIG. 7 is a longitudinal cross section of a link between an air inlet and an engine that shows the variant shown in FIG. 6 in detail.
Figure 8:
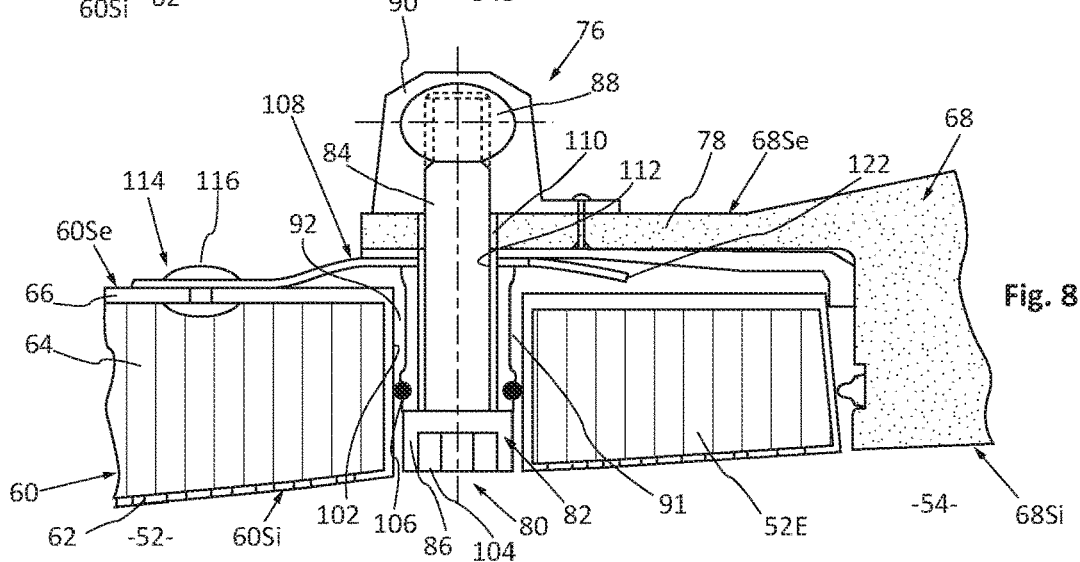
FIG. 8 is a cross section of a front upper portion of a nacelle of an aircraft that shows another variant of the invention.

According to other embodiments shown in FIGS. 6 to 8, for each linking element 80, the acoustic panel 60 includes a recess 92 that passes through the acoustic panel 60 and that has a substantially identical section along the entire height of the acoustic panel 60.

The recesses 92 are separate and the section of the recesses is as small as possible to minimize alteration of the acoustic treatment.

To ensure continuity of the inner surface 60Si and a seal, each acoustic panel 60 has, for each recess 92, a stopper 94 provided with a surface 94S that is flush with the inner surface 60Si of the acoustic panel 60 and that is linked to the acoustic panel 60 using any appropriate means.

According to one embodiment, each stopper 94 is linked to the acoustic panel 60 by bonding, riveting.

According to another embodiment shown in FIGS. 4 and 5, each stopper 94 is linked to the acoustic panel 60 by a C-shaped supporting element 96 comprising a first leg 96.1 linked to the reflective layer 66 by screws or rivets 98 and a second leg 96.2 linked to the stopper 94 by screws or rivets 100.

According to another embodiment shown in FIG. 8, each recess 92 has a peripheral rim 102 having a section substantially identical to the section of the head 86 of the linking element 80. To ensure the continuity of the inner surface 60Si of the acoustic panel 60, the head 86 of the linking element 80 has a surface 104 extending the inner surface 60Si of the acoustic panel 60. To provide a seal, an O-ring 106 is positioned between the linking element 80 and the peripheral rim 102 of the recess 92.

Figure 11:
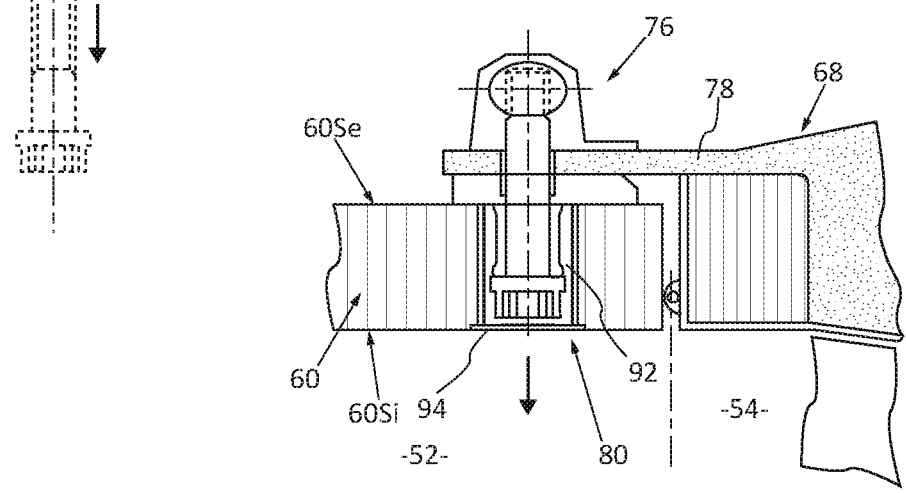
FIG. 11 is a cross section of a front upper portion of a nacelle of an aircraft that shows another variant of the invention.

According to another embodiment shown in FIG. 11, the stopper 94 is a cap with a cylindrical side wall that fits into the recess 92.

According to a first variant shown in FIGS. 4 and 5, the first conduit 52 is linked directly to the sleeve 78 by linking elements 80.

According to other variants illustrated in FIGS. 6 to 8, the first conduit 52 is linked to the sleeve 78 by means of at least one linking strip 108 arranged between the first conduit 52 and the sleeve 78.

The term "strip" in this document means a component with a thickness (dimension measured in the radial direction) that is clearly less than the width (dimension measured at the circumference) and/or length (dimension measured in the longitudinal direction) thereof.

According to one layout, the link 76 between the air inlet 50 and the engine 56 has several linking strips 108 that are distributed about the entire circumference of the first conduit 52. Preferably, the linking strips 108 are arranged over identical angular sectors θ to balance the stresses.

By way of example, the link 76 has three linking strips 108 each of which is arranged over an angular sector of approximately 120°.

Each linking strip 108 has at least one first joining zone 110 that is offset from the first conduit 52 in the radial direction and that is designed to link the linking strip 108 and the sleeve 78 and at least one second joining zone 114 that is offset in the longitudinal direction in relation to the first joining zone 110 and that is designed to link the linking strip 108 and the first conduit 52.

Each first joining zone has a through hole 112 designed to receive the threaded stem 84 of the linking element 80. Each second joining zone 114 has at least one attachment element 116, such as a rivet, for example, to link the linking strip 108 and the first conduit 52.

Each linking strip 108 is designed to deform elastically in the radial direction when in operation. Thus, for each linking strip 108, the first joining zone 110 can be moved in the radial direction in relation to the second joining zone 114 when a force that is oriented in the radial direction and that does not exceed a given threshold is exerted between the first and second conduits 52, 54.

According to a variant shown in FIG. 7, each linking strip 108 has a third joining zone 118 that is linked to the first conduit 52 by at least one attachment element 120 (shown schematically by a center line), for example a rivet, the second and third joining zones 114 and 118 being arranged on either side of the first joining zone 110.

According to another variant shown in FIG. 8, the second joining zones 114 are arranged at the front of the first joining zones 110 and each linking strip 108 includes an edge 122 oriented towards the rear of the nacelle that is free and not linked to the first conduit 52.

According to a layout shown in FIG. 8, the linking strip 108 only provides the link 76 between the first conduit 52 and the sleeve 78.

According to another layout shown in FIGS. 6 and 7, the linking strip 108 includes an extension 124 linked to a frame 126. In this case, the linking strip 108 only provides the link 76 between the first conduit 52 and the sleeve 78.

To link the first and second conduits 52, 54, the linking strips 108 are attached to the first conduit 52. The first conduit 52 provided with linking strips 108 is then fitted into the sleeve 78. Preferably, the edge 122 oriented towards the second conduit 54 is curved to facilitate insertion of the linking strips 108 that are attached to the first conduit 52. Finally, the screws 82 are put in place and tightened from the inside of the first and second conduits 52 and 54.

The linking strips 108 help to center the first conduit 52 in relation to the second conduit 54 during assembly. When in operation, the linking strips 108 deform to limit the propagation of stresses between the first and second conduits 52, 54.

Figure 9:
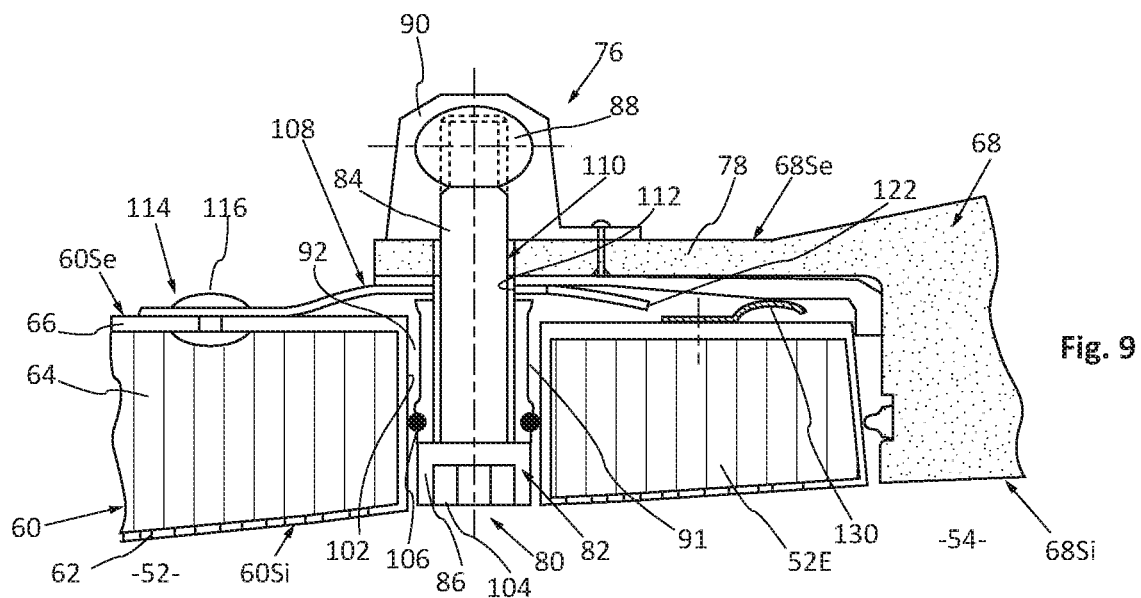
FIG. 9 is a cross section of a front upper portion of a nacelle of an aircraft that shows another variant of the invention.

According to a variant shown in FIG. 9, the link 76 has a centering device 130 that is linked to the conduit 52 and that helps to center the first conduit 52 in relation to the sleeve 78. The centering device 130 comprises a plurality of elastic strips distributed about the periphery of the first conduit 52.

Figure 12:
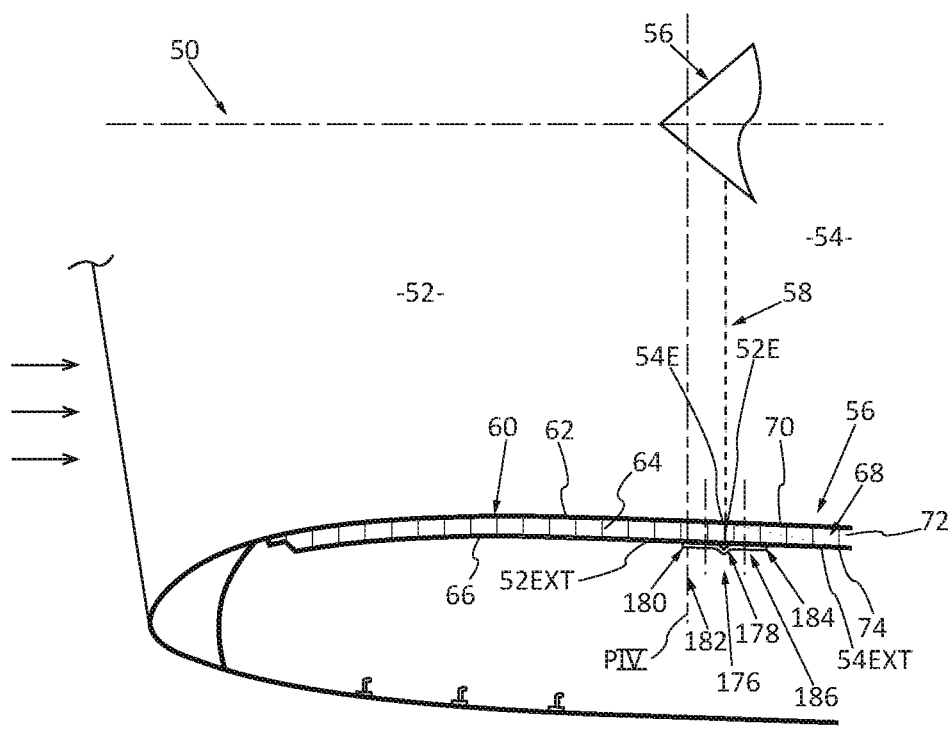
FIG. 12 is a cross section of a front lower portion of a nacelle of an aircraft that shows a first variant of the invention.
Figure 13:
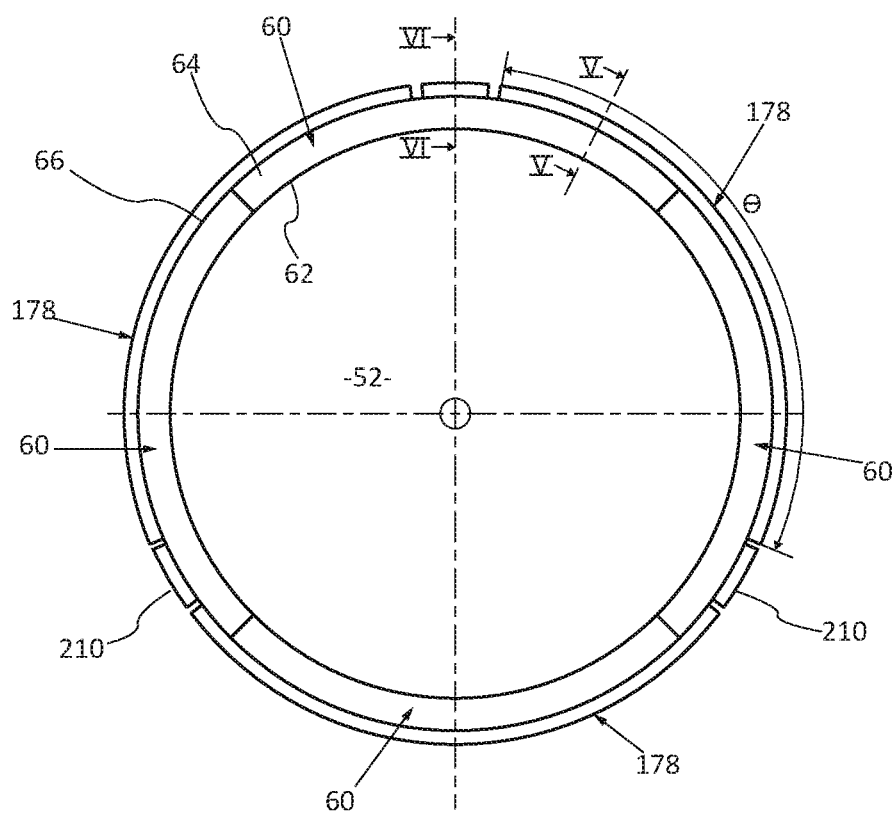
FIG. 13 is a cross section taken along the plane PIV in FIG. 12 of an inner conduit of an air inlet shown in FIG. 12.

According to an embodiment shown in FIGS. 12 and 13, each acoustic panel 60 has a rim 52E that is arranged in a transverse plane and each panel 68 has a rim 54E that is arranged in a transverse plane, the two rims 52E and 54E being pressed against one another at the joining plane 58.

Figure 16:
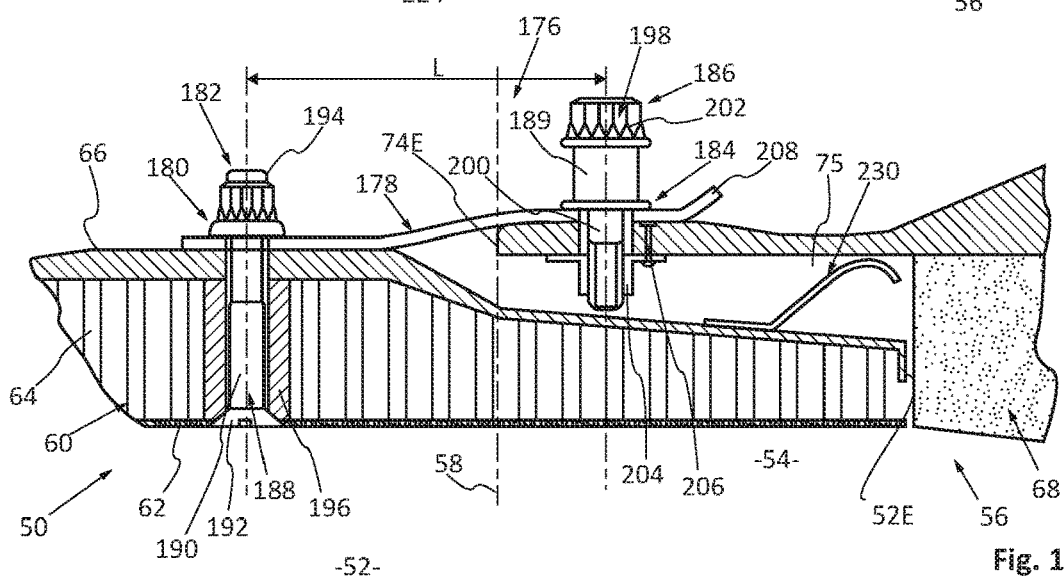
FIG. 16 is a cross section taken along the line V-V of a link between an air inlet and an engine that shows an embodiment of the invention.

According to another embodiment shown in FIG. 16, the outer wall 74 of each panel 68 extends towards the front of the nacelle in relation to the rest of the panel 68. The end 74E thereof is positioned approximately in the joining plane 58. Thus, the outer wall 74 forms a seat 75 that is designed or configured to receive the end 52E of the acoustic panels 60 that extend beyond the joining plane 58.

The air inlet 50 and the engine 56 are linked by a link 176 that includes linking strips 178 each of which has a first joining zone 180 linked to the first conduit 52 of the air inlet 50 by at least one first linking element 182 and one second joining zone 184 that is linked to the second conduit 54 of the engine 56 by at least one second linking element 186.

Each of the first and second linking elements 182 and 186 has a stem oriented in the radial direction and the first and second joining zones 180, 184 have a through hole for each first or second linking element 182, 186. By way of example, a first or second linking element 182 and 186 may be a bolt, a screw, a rivet or other.

In this document, "strip" means a component with a thickness (dimension measured in the radial direction) that is clearly less than the width (dimension measured at the circumference) and/or length (dimension measured in the longitudinal direction) thereof. Naturally, a strip is designed to deform elastically in an advantageous direction perpendicular to the width thereof.

Each linking strip 178 is positioned to deform elastically in the radial direction when in operation. Thus, for each linking strip 178, one of the first and second joining zones 180, 184 can be moved in the radial direction in relation to the other joining zone 180, 184 when a force that is oriented in the radial direction and that does not exceed a given threshold is exerted between the first and second conduits 52, 54.

Each linking strip 178 has a curved mid portion 187 that is interposed between the first and second joining zones 180, 184 and arranged off-center in relation to at least one of the first and second joining zones 180, 184. This mid portion 187 facilitates the elastic deformation of the linking strip 178.

The link 176 between the air inlet 50 and the engine 56 has several linking strips 178 that are distributed about the entire circumference of the nacelle.

Preferably, the linking strips 178 are arranged over identical angular sectors θ to balance the stresses.

In the example shown in FIG. 13, the nacelle has three linking strips 178 each of which is arranged over an angular sector of approximately 120°.

Figure 14:
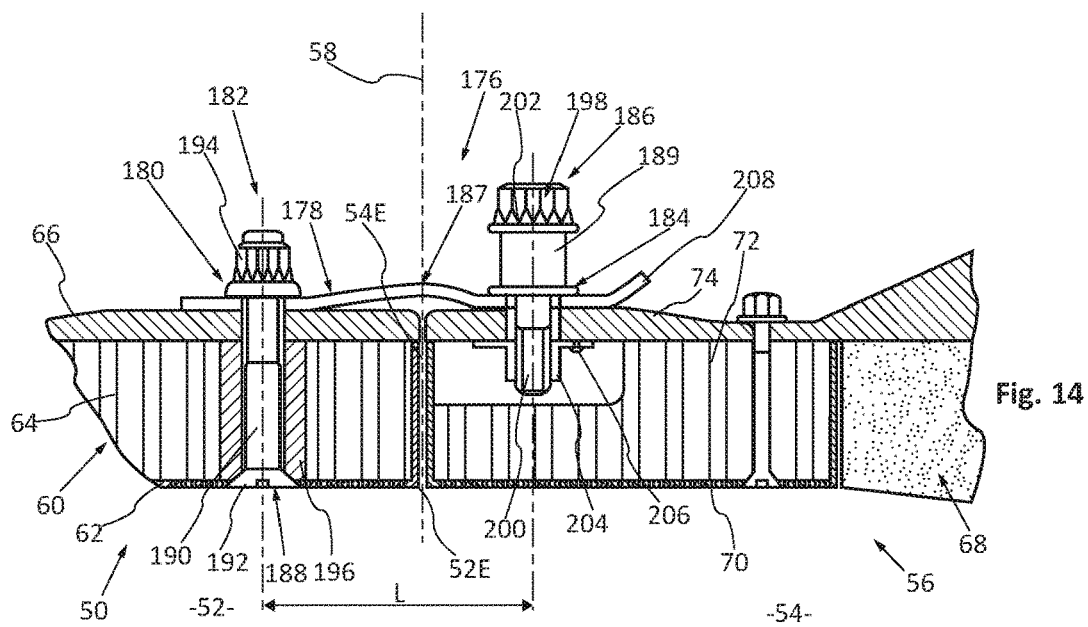
FIG. 14 is a cross section taken along the line V-V in FIG. 13 of a link between an air inlet and an engine that shows an embodiment of the invention.

The distance L between the first and second joining zones 180, 184 may be longer or shorter, as shown in FIGS. 14 and 16.

The first linking elements 182 are arranged, for example, in two rows lying in different transverse planes about the entire circumference of the nacelle, the first linking elements 182 being regularly distributed in each of the rows. Each first linking element 182 is a bolt that comprises a screw 188 with a threaded stem 190 and a head 192 as well as a nut 194 that is designed to be screwed onto the threaded stem 190, the linking strip 178 being positioned between the reflective layer 66 and the nut 194. For each first linking element 182, the acoustic panel 60 includes a tubular insert 196 designed to prevent the honeycomb layer 64 from deforming. As shown in FIGS. 14 and 16, the tubular insert 196 is inserted between the head 192 of the screw 188 and the reflective layer 66, the head 192 of the screw 188 being flush with the outer surface of the acoustically resistive layer 62.

At least one first linking element 182 includes a compressible sheath that is inserted between the nut 194 and the linking strip 178.

As shown in FIGS. 14 and 16, the second linking elements 186 are regularly distributed about the entire circumference of the nacelle. Each second linking element 186 is a bolt that comprises a screw 198 with a threaded stem 200 and a head 202 as well as a nut 204 that is designed to be screwed onto the threaded stem 200, the linking strip 178 being positioned between the outer layer 74 and the head 202 of the screw 198. Preferably, the nut 204 is rigidly connected to the outer layer 74 by any suitable means, such as rivets 206 for example. Thus, the screw 198 may be tightened without having to hold the nut 204 with a tool.

At least one second linking element 186 includes a compressible sheath 189 that is inserted between the head 202 of the screw 198 and the linking strip 178 that increases the capacity of the link 186 to withstand the radial deformations caused by the stresses and/or the movements of the engine.

According to one assembly method, the linking strips 178 are attached to the first conduit 52 using the first linking elements 182. The linking strips 178 are then fitted about the second conduit 54, then the second linking elements 186 are positioned to link the linking strips 178 and the second conduit 54. According to this assembly method, the second linking elements 186 are positioned and tighten from outside the first and second conduits 52, 54.

Each linking strip 178 has one end 208 that is oriented towards the rear of the nacelle and that is curved towards the outside of the nacelle, to help fit the linking strips 178 about the second conduit 54.

Figure 15:
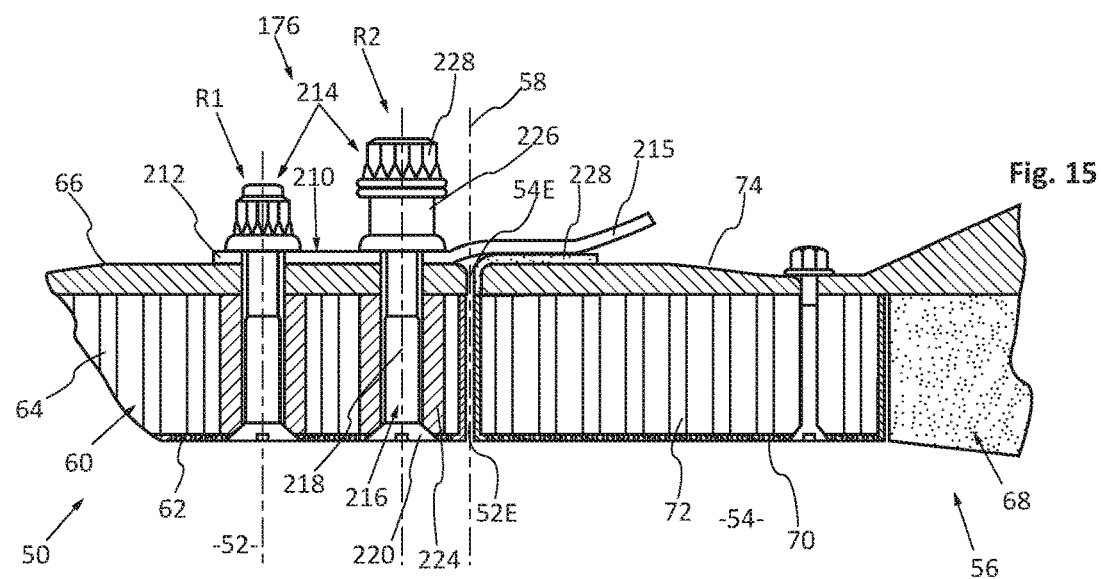
FIG. 15 is a cross section taken along the line VI-VI in FIG. 13 of a link between an air inlet and an engine that shows an embodiment of the invention.

According to another characteristic shown in FIG. 15, the link 176 has centering strips 210 comprising a first end 212 that is rigidly connected to the first conduit 52 by attachment elements 214 and a second end 215 that is designed to fit about the second conduit 54 and that is not rigidly connected to the second conduit 54.

Each centering strip 210 is designed to deform elastically in the radial direction. Thus, for each centering strip 210, the second end 215 can move in the radial direction in relation to the first end 114.

These centering strips 210 make it possible to center the first conduit 52 of the air inlet 50 in relation to the second conduit 54 of the engine 56 when the linking strips 178 are fitted about the second conduit 54, before same are attached to the second conduit 54.

The link 176 has at least three centering strips 210 that are distributed regularly about the first conduit 52. As shown in FIG. 15, the centering strips 210 are inserted between the linking strips 178.

The width (dimensions measured at the circumference) of the centering strips 210 is clearly less than the width of the linking strips 178. By way of example, the width of the centering strips 210 is between 2 and 10 cm.

For each centering strip 210, the second conduit 52 has a notch formed in the outer wall 74 of the second conduit 54 that extends in the longitudinal direction and that is designed to receive a centering strip 210. The width of each notch is substantially equal to the width of each centering strip 210 to prevent the first conduit 52 from rotating in relation to the second conduit 54.

The attachment elements 214 are arranged in two rows R1, R2 lying in different transverse planes about the entire circumference of the nacelle, the attachment elements 214 being regularly distributed in each of the rows. Each attachment element 214 is a bolt that comprises a screw 216 with a threaded stem 218 and a head 220, as well as a nut 222 that is designed to be screwed onto the threaded stem 218, the centering strip 210 being positioned between the reflective layer 66 and the nut 222. For each attachment element 214, the acoustic panel 60 includes a tubular insert 224 designed to prevent the honeycomb layer 64 from deforming. The tubular insert 224 is inserted between the head 220 of the screw 216 and the reflective layer 66, the head 220 of the screw 216 being flush with the outer surface of the acoustically resistive layer 62.

At least one attachment element 214 includes a compressible sheath 226 that is inserted between the nut 222 and the centering strip 210.

According to one embodiment, the second end 215 of the centering strips 210 is curved towards the outside of the nacelle, to help fit the centering strips 210 about the second conduit 54.

The second end 215 of the centering strips 210 and/or the outer wall 74 of the second conduit 54 have a coating or are made of a material that enables the centering strips 210 to slide over the surface of the outer wall 74 of the second conduit 52. By way of example and as shown in FIG. 15, the outer wall 74 has a polytetrafluoroethylene coating 228.

The linking strips 178 and the centering strips 210 are made of metal or a composite material and are made of a material that enables same to deform elastically in the radial direction.

According to one embodiment shown in FIG. 16, the link 176 has a centering device 230 that is linked to the conduit 52 and that helps to center the first conduit 52 in relation to the second conduit 54. The centering device 230 comprises a plurality of elastic strips distributed about the periphery of the first conduit 52.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. An aircraft nacelle comprising:
a conduit rigidly connected to an air inlet,
a conduit rigidly connected to an engine,
a link between the conduit rigidly connected to the air inlet and the conduit rigidly connected to the engine, the link including a sleeve configured to receive one end of a first conduit that is either the conduit rigidly connected to the air inlet or the conduit rigidly connected to the engine, said sleeve rigidly connected to a second conduit that is either the conduit rigidly connected to the air inlet or the conduit rigidly connected to the engine as well as linking elements that link the sleeve and the first conduit and that are distributed about an entire circumference of the nacelle,
each linking element having, firstly, a screw with a threaded stem oriented in a radial direction and a head that is accessible from the inside of the first conduit, and, secondly, a nut screwed onto the threaded stem and linked to the sleeve by a system to prevent said nut from rotating about a radial axis of rotation,
wherein the link has at least one linking strip configured to link the first conduit and the sleeve and that is arranged between the first conduit and the sleeve, each linking strip having at least one first joining zone configured to link the linking strip and the sleeve and that is offset from the first conduit in the radial direction and at least one second joining zone configured to link the linking strip and the first conduit and that is offset in the longitudinal direction in relation to the first joining zone.

2. The aircraft nacelle as claimed in claim 1, wherein the first conduit has at least one acoustic panel comprising an acoustically resistive layer, at least one honeycomb layer and one reflective layer arranged in the radial direction moving away from a longitudinal axis of the engine and in that, for each linking element, at least the acoustically resistive layer and the honeycomb layer have a recess configured to receive the head of the linking element.

3. The aircraft nacelle as claimed in claim 2, wherein each acoustic panel has, for each recess, a stopper linked to the acoustic panel and having a surface extending an inner surface of the acoustic panel.

4. The aircraft nacelle as claimed in claim 2, wherein each recess has a peripheral rim having a section substantially identical to a section of the head of the linking element, the head of the linking element having a surface extending an inner surface of the acoustic panel, an O-ring positioned between the linking element and the peripheral rim of the recess.

5. The aircraft nacelle as claimed in claim 1, wherein each linking strip is configured to deform elastically in the radial direction when in operation.

6. The aircraft nacelle as claimed in claim 1, wherein each linking strip has a third joining zone configured to link the linking strip and the first conduit, the second and third joining zones arranged on either side of the first joining zone.

7. The aircraft nacelle as claimed in claim 1, wherein the second joining zones are arranged at the front of the nacelle in relation to the first joining zones and wherein each linking strip includes an edge oriented towards the rear of the nacelle that is free.

8. The aircraft nacelle as claimed in claim 1, further comprising at least one linking strip, wherein each linking strip has an edge oriented towards the second curved conduit.

* * * * *